Jan. 12, 1960  S. B. WELCH  2,921,174
ELECTRIC SURFACE HEATING UNIT SYSTEM
Filed Feb. 13, 1959  2 Sheets-Sheet 1

INVENTOR
STANLEY B. WELCH
BY T.G. Dypart
HIS ATTORNEY

United States Patent Office 2,921,174
Patented Jan. 12, 1960

2,921,174

ELECTRIC SURFACE HEATING UNIT SYSTEM

Stanley B. Welch, Louisville, Ky., assignor to General Electric Company, a corporation of New York Application February 13, 1959, Serial No. 793,056

9 Claims. (Cl. 219—20)

This invention relates to electric heating units, and more particularly to an automatically controlled surface heating unit system.

For a number of years the makers of electric ranges have sought to provide surface cooking units capable of generating heat at a very high rate so that water may be brought to a boil very quickly, and also, of course, to provide heat at several lower rates suitable for constant temperature cooking. Various heating units capable of approaching this performance goal have been proposed, including simple multi-wattage heating units, heating units controlled in accordance with the temperature of the utensil being heated, and heating units controlled in accordance with the temperature of the heating unit itself. Surface cooking units or hotplates of the last mentioned type have the advantage that their heat outputs may be maintained at a very high rate so long as the heated load (e.g., a utensil and its contents) is capable of absorbing heat at this rate, and yet the risk of damage to the heating unit (or even explosion of the unit) resulting from overheating is eliminated because the power supply is automatically interrupted before the danger point is reached. Hence the maximum heat output rate of the unit need not be limited to one which could be safely maintained without a load to receive the heat energy.

Various arrangements for sensing the temperature of the heating unit and regulating its power output have been proposed. One such arrangement makes use of the fact that the refractory insulating materials generally used in conventional sheath type heating units have negative temperature coefficients of resistance, or in other words, the resistance of these materials decreases at a definite rate with increases in their temperature. However, insofar as the present inventor is aware, this arrangement has never been put to practical use, presumably because no commercially useful system for measuring the resistance of the insulating material of a heating unit and controlling its energization in accordance therewith has been developed. In one known system a special electrode is built into the heating unit and connected in a leakage current control circuit which functions to measure the resistance of the insulating material, but the cost of such heating units would be substantially greater than the cost of a conventional sheathed heater. Further, it is difficult, if not completely impractical to place a special electrode in the low mass small diameter heating units currently used in high speed surface cooking units.

Accordingly, the general object of the present invention is to provide an improved electric heating system in which the heat output of a conventional sheathed heating unit may be regulated in accordance with the resistance of the insulating material disposed therein, so that the temperature of the unit may be maintained within safe limits.

Further objects and advantages of the invention will become apparent as the following description proceeds, and the features of novelty which characterize the invention will be pointed out with particularity in the claims annexed to and forming a part of this specification.

Briefly stated, in accordance with one aspect of this invention there is provided a sheathed heating unit including a resistance element embedded in refractory insulating material having a negative temperature coefficient of resistance, switching means for connecting the heating unit to a power circuit, a control circuit including the resistance element arranged to supply a control signal which is a function of the resistance of the insulating material, means for energizing the control circuit during brief periodic intervals when the resistance element is disconnected from the power circuit, and means responsive to the control signal for controlling energization of the heating unit in such a way that its maximum heat output rate may be maintained so long as a load capable of absorbing heat at that rate is present.

For a better understanding of the invention reference is made to the following description and the accompanying drawings in which.

Figure 1:
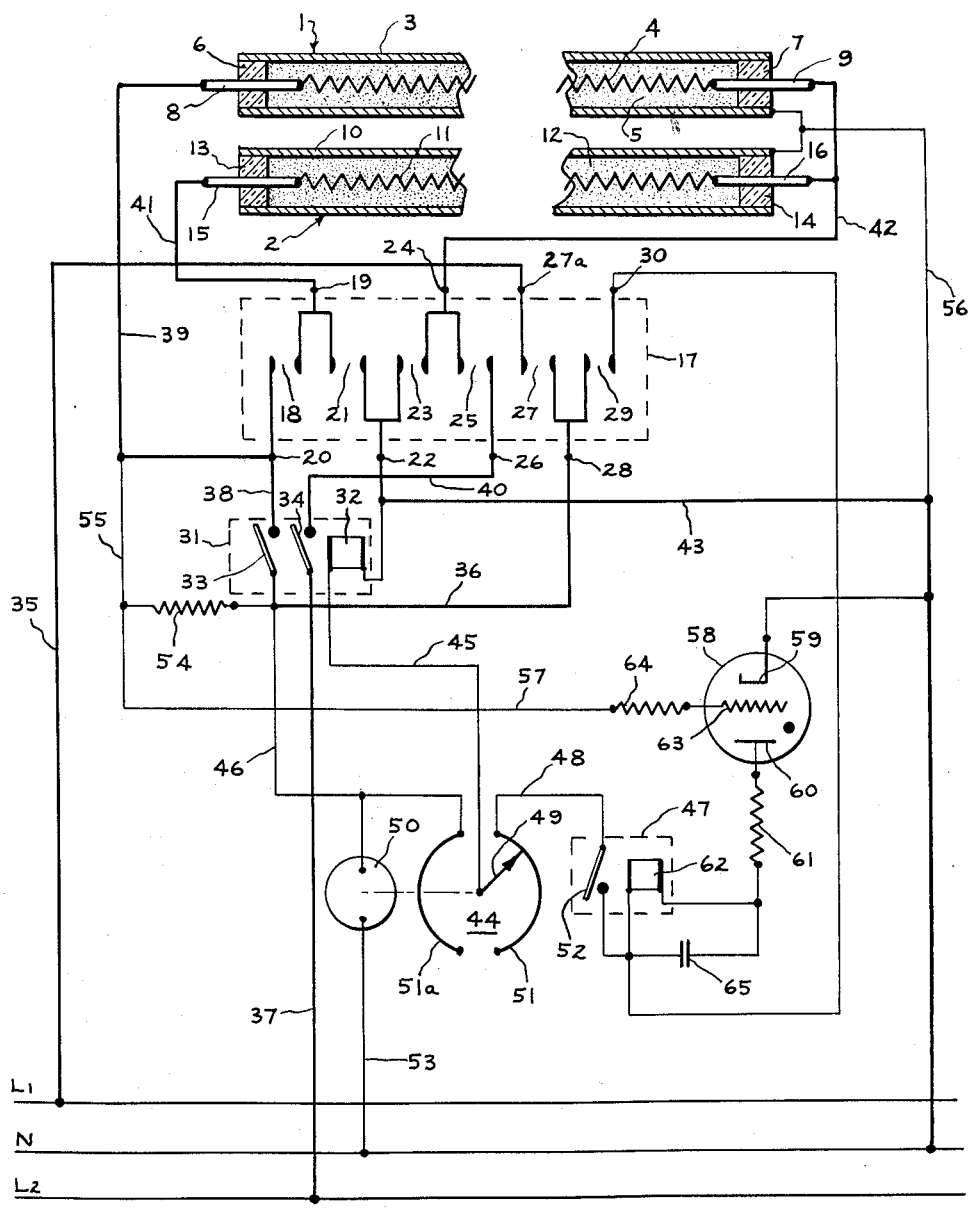
Fig. 1 is a diagrammatic view illustrating one embodiment of the present invention.

Referring to Fig. 1 of the drawing, the numerals 1 and 2 designate a pair of sheathed heating units which are of well known construction; heating unit 1 comprises a tubular metal sheath 3 enclosing a resistance element 4 embedded in a refractory insulating material 5 such as powdered magnesium oxide. The ends of sheath 3 are closed by means of a pair of vitreous sealing bushings 6 and 7 through which terminal pins 8 and 9 extend. The ends of resistance element 4 are, of course, electrically and mechanically connected to terminals 8 and 9. Similarly, heating unit 2 includes a tubular metal sheath 10 enclosing resistance element 11 embedded in refractory insulating material 12. The ends of sheath 10 are sealed by means of a pair of vitreous sealing bushings 13 and 14 which support terminal ends 15 and 16. It will be understood that heating units 1 and 2 may be arranged in any suitable structural configuration so as to heat material supported in heat transfer relation therewith. When arranged to form a surface cooking unit it will be understood that heating units 1 and 2 are preferably arranged as shown in Reissue Patent No. 22,177 granted September 8, 1942 to J. C. Sharp. Briefly, in such an arrangement the heating units are coiled in flat spiral configuration so as to form a supporting surface for cooking utensils and the like. Throughout the present specification the term "heating load" will be used to designate the cooking utensil or other objects or material heated by heating units 1 and 2.

Heating units 1 and 2 are connected by means of a power circuit, to be described, to a three wire source of electrical energy, illustrated in the drawing as a three wire power supply including power lines L1 and L2, and a neutral line N. Actually, a plurality of power circuits are provided for connecting resistance elements 4 and 11 of the heating units to the power source in various series and parallel circuit relationships so as to provide a number of heat output levels. Thus a multi-position multi-contact switch 17, which may be of the type disclosed in Patent No. 2,431,904 granted December 2, 1947 to J. L. Andrews, is connected in circuit with the heating units and the power source. Heat selector switch 17 includes a pair of contacts 18 arranged to connect switch terminals 19 and 20, a pair of contacts 21 arranged to connect terminals 19 and 22, a pair of contacts 23 arranged to connect terminals 22 and 24, a pair of contacts 25 arranged to connect terminals 24 and 26, a pair of contacts 27 arranged to connect terminals 27a and 28 and a pair of contacts 29 arranged to connect terminals 28 and 30. Switch 17 is provided with an off position and five heating level positions as follows: Ultra-high, High, Second, Low and Warm. A table showing the pairs of switch contacts which are closed in each of these switch positions is set forth below.

| Switch Position | Closed Contacts | Unit 1 Voltage | Unit 2 Voltage |
|---|---|---|---|
| Ultra-High | 18—25—27—29 | 240 | 240 |
| High | 18—25—27 | 240 | 240 |
| Second | 18—23—27 | 120 | 120 |
| Low | 23—27 | 120 | 0 |
| Warm | 21—27 | (Units in series across 120 v.) | |
| Off | None | 0 | 0 |

Before considering the power circuits in detail, it should be understood that one of the power circuits provided by selector switch 17 includes switching means therein such as a double pole relay 31 provided with a coil 32 and contactors 33 and 34 which close each time coil 32 is energized. Relay 31 is supplied with power through a conductor 35 connecting line L1 and terminal 27a of switch 17, contacts 27 and terminal 28 of the switch, and a conductor 36 connected to contactor 33 of the relay. Contactor 34 of relay 31 is connected directly to power supply line L2 by a conductor 37. Thus, when relay 31 closes, power at line L1 voltage is supplied to terminal 20 of switch 17 through conductor 38 and also to terminal 8 of heating unit 1 through conductor 39, while power at line L2 voltage is supplied to terminal 26 of switch 17 through conductor 40. From terminal 20, line L1 voltage is supplied through contacts 18 and switch terminal 19 to terminal 15 of heating unit 2 through conductor 41, while line L2 voltage is supplied from switch terminal 26 through contacts 25 and switch terminal 24 to terminal 9 of heating unit 1 and terminal 16 of heating unit 2 by means of conductor 42. Finally, terminal 9 of heating unit 1 and terminal 16 of heating unit 2 may be connected to the neutral line N through a circuit including conductor 42, switch terminal 24, contacts 23, switch terminal 22 and a conductor 43 connected to the neutral line N. From the foregoing description and the switch contact table above, it will be seen that heating units 1 and 2 may be connected in various series and parallel circuit relationships so as to provide several heat output levels, it being understood that each of the power circuits indicated in the table are interrupted whenever relay 31 is open.

In accordance with the present invention, relay 31 is controlled by means of a control circuit arranged to provide a signal which is a function of the resistance of the insulating material in heating units 1 and 2 when selector switch 17 is actuated to the Ultra-High position. In this position, it will be seen from the above switch contact table and the circuit diagram shown in Fig. 1 that heating units 1 and 2 are connected in parallel across lines L1 and L2 whenever relay 31 is closed, so as to supply maximum heat output.

Since conventional sheathed heating units are not hermetically sealed the moisture content of the insulating material therein varies, depending on the humidity of the surrounding air. Further, the resistance of magnesium oxide, the most commonly used insulating material, decreases as its moisture content increases. Thus it will be evident that the resistance of relatively "wet" insulating material even at room temperature, may correspond to its resistance when "dry" at temperatures greater than the maximum operating temperature for such materials. In order to insure operation of a heating unit control system which responds to a signal dependent on the variable resistance of refractory insulating materials, it will be seen that the moisture content thereof must be stabilized, and this may be done by energizing the heating unit at a predetermined minimum level sufficient to evaporate unwanted moisture irrespective of the control signal. Accordingly, coil 32 of relay 31 may be connected in circuit with a periodic switching device 44 by means of conductor 45 so that current may be supplied to the coil from line L1 through one or the other of two circuit paths.

Switching device 44 functions to connect coil 32 of the relay in successive alternating time intervals to first one and then the other of the two circuit paths, one of which connects directly, by means of conductor 46, to conductor 36 which in the Ultra-High position is energized at line L1 voltage. The other circuit path provided by periodic switch device 44 includes a control relay 47 connected thereto by conductor 48 and arranged to respond to a control signal which is a function of the resistance of insulating materials 5 and 12. As diagrammatically indicated in the drawing, switching device 44 may include a rotary brush contact 49 arranged to be rotated at constant speed by a motor 50 and to sweep over a pair of separate arcuate contact surfaces 51 and 51a. Thus, as rotary brush 49 is rotated by motor 50, coil 32 is energized through conductor 36 at spaced intervals of time, and in the alternate time intervals coil 32 is connected in circuit with contactor 52 of relay 47 and is accordingly under the control of the latter relay. Motor 50 is connected by means of conductors 46 and 53 across conductor 36 and the neutral line N so that it is energized through selector switch contact 27 whenever the switch is actuated to a heating position.

From the description thus far it will be evident that when selector switch 17 is actuated to the High, Second, Low or Warm positions heating units 1 and 2 are energized at the voltages indicated in the foregoing table at recurring time intervals (of the order of fifteen to thirty seconds, for example) which are so spaced that the heating units are energized a fractional portion of the total time period during which the units are connected in the power circuit selected by switch 17.

In the Ultra-High position of selector switch 17, however, both heating units may be energized substantially continuously if the control signal supplied by the control circuit now to be described indicates that the temperature of the heating unit is below a predetermined maximum limit. This control circuit includes a resistor 54 connected to conductor 36, and hence to line L1 when switch 17 is in the Ultra-High position, and in series with terminals 8 and 15 of heating units 1 and 2 by means of conductor 55, conductor 39, contacts 18 and conductor 41. The control circuit also includes resistance elements 4 and 11, insulating material masses 5 and 12 and sheaths 3 and 10 which are connected to a common conductor 56 which in turn is connected to the neutral line N by grounding or other suitable means. It will be observed that contacts 21 and 23 of selector switch 17 are open when the switch is in the Ultra-High position, and hence terminals 9 and 14 of the heating units are disconnected from the power circuit. The resistance of fixed resistor 54 is chosen so that as the resistance of insulating material masses 5 and 12 varies, a variable signal which is a function of this variable composite resistance is impressed on conductor 57, the latter being connected at the junction point of resistor 54 and conductor 55. This signal is utilized to control a gaseous discharge tube, such as a glow discharge triode 58. Triode tube 58 is provided with a cathode 59 connected to neutral line N, an anode 60 connected through a limiting resistor 61 to the coil 62 of control relay 47 and a control grid 63 connected through a limiting resistor 64 to conductor 57. Thus the energization of coil 62 of control relay 47 is effected whenever triode 58 fires (i.e., becomes conductive so as to complete a circuit path between cathode 59 and anode 60) and this occurs only when the voltage applied to control grid 33 is greater than a predetermined "cut-off" value. As usual in circuits of this nature, a capacitor 65 is connected across terminals of coils 62 of the control relay.

In operation, when selector switch 17 is actuated to the Ultra-High position, motor M is immediately and continuously energized, and relay 31 is energized when rotary brush 49 is in contact with arcuate contact 51a of switch device 44. Thus heating units 1 and 2 are energized at full line voltage during at least a portion of the total energization period. As brush 49 leaves contact 51a relay 31 drops out and will be reclosed only if coil 62 of control relay 47 is energized. Coil 62 of the relay will be energized only if current is passing through triode 58, and this in turn is determined by the voltage on control grid 63, which, of course, is a function of the resistance of insulating material masses 5 and 12. If the resistance of these insulating materials is greater than that of resistor 54 by a predetermined amount, thus indicating that the heating units are below their maximum operating temperatures the voltage on grid 63 will be greater than cut-off, the tube will be rendered conducting, and relay 47 will close. Thus, so long as the heating units remain below their maximum operating temperature power relay 31 will be closed during the time intervals when brush 49 sweeps contact 51 as well as during the intervals when it sweeps contact 51a. However, should either heating unit exceed its maximum operating temperature the resistance of the over-heated insulating material therein decreases, thus decreasing the voltage on control grid 63 of triode 58 to below its cutoff value. Triode 58 then becomes non-conducting and control relay 47 is de-energized.

During the intervals when brush 49 is in engagement with contact 51 power relay 31 may close only if triode 58 is rendered conducting (indicating that heating units 1 and 2 are no longer overheated). However, this may occur at any instant during these intervals, so that if the temperature of the heating units drops to a safe level during such an interval they are immediately energized. Thus during each interval when brush 49 is in engagement with contact 51 the heating units may be either energized or de-energized throughout the interval, or they may be energized during only a portion of the interval, depending upon their temperature.

From the foregoing it will be evident that the energization of heating units 1 and 2 may be limited whenever the resistance of the insulating material therein is less than a predetermined value (indicating an overtemperature or "wet" condition) and that otherwise a high heat output rate may be safely maintained.

Figure 2:
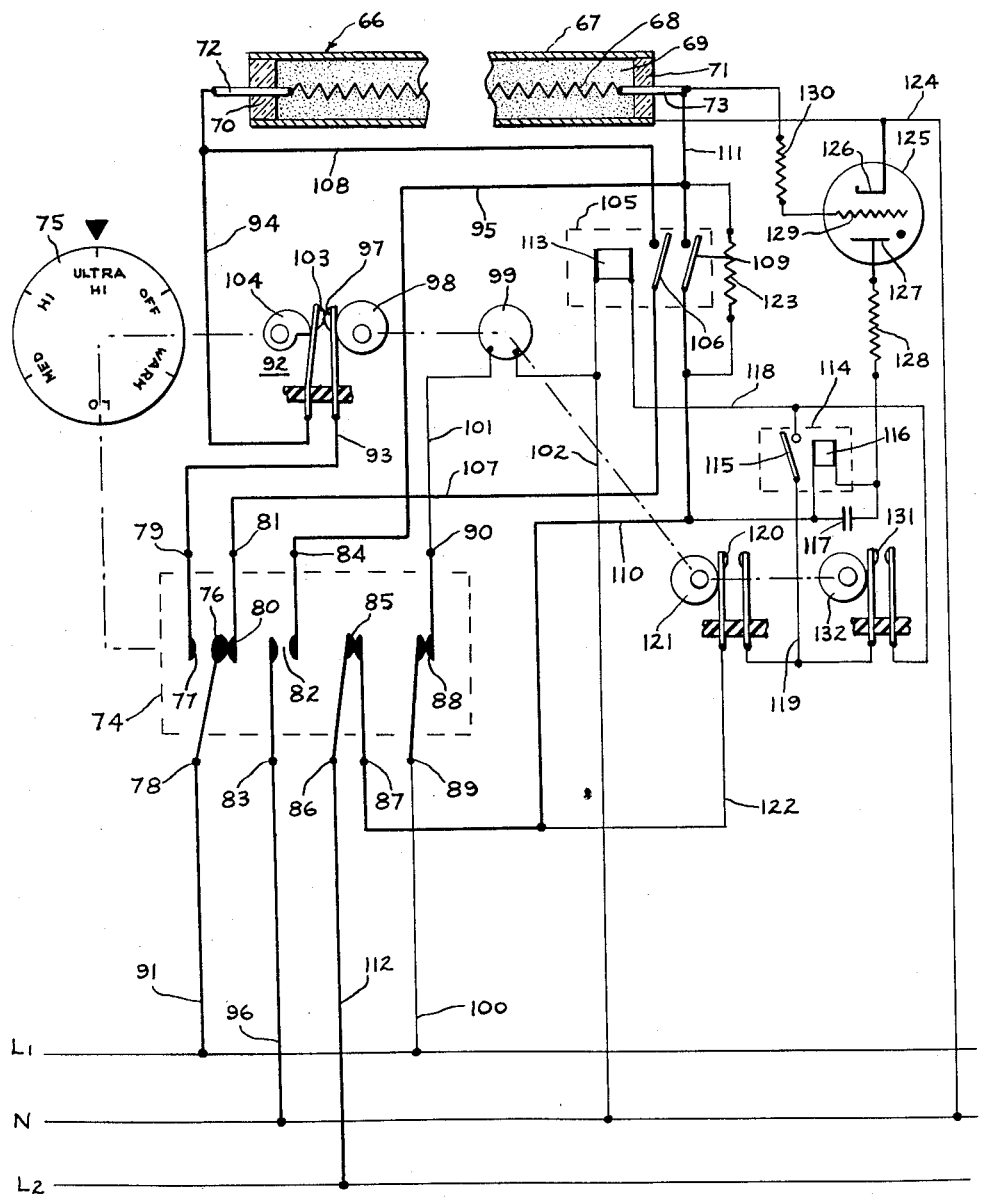
Fig. 2 is a diagrammatic view illustrating another embodiment of the present invention.

Referring to Fig. 2, the numeral 66 designates a sheathed heating unit including a tubular metal sheath 67 enclosing a resistance element 68 embedded in a refractory insulating material 69 such as powdered magnesium oxide. The ends of sheath 67 are closed by means of a pair of vitreous sealing bushings 70 and 71 through which terminal pins 72 and 73 extend. The ends of resistance element 68 are, of course, electrically and mechanically connected to terminal pins 72 and 73. It will be understood that heating unit 66 may be arranged in any suitable structural configuration so as to heat material supported in heat transfer relation therewith, including the surface cooking unit configuration disclosed in the aforesaid Sharp Reissue Patent No. 22,177.

Heating unit 66 is arranged to be connected, by means of one or the other of two power circuits to be described, to a three wire source of electrical energy, illustrated in the drawing as a three wire power supply including power lines L1 and L2, and a neutral line N. The desired power circuit may be selected by actuation of a suitable selector switch, such as a multi-contact three position switch 74 provided with a manually operable rotary control knob 75 mechanically connected thereto. Knob 75 includes an Off position in which all pairs of contacts in switch 74 are disengaged, an Ultra-High position in which one of the two power circuits is completed, and a range of lower heat positions in which the other of the two circuits is completed. Thus switch 74 includes a double throw contact 76 arranged to engage either contact 77 so as to connect terminals 78 and 79 or contact 80 so as to connect terminals 78 and 81 (or neither of contacts 77 and 80 in the Off position), a pair of contacts 82 arranged to connect terminals 83 and 84, a pair of contacts 85 arranged to connect terminals 86 and 87 and a pair of contacts 88 arranged to connect terminals 89 and 90. The switch contacts of switch 74 are shown in the positions they occupy when knob 75 is in the Ultra-High position. In the Off position, all pairs of contacts are out of engagement with each other, and in all remaining positions of knob 75 contacts 76—77 are closed, contacts 82 are closed, contacts 85 are open and contacts 88 are open.

Considering first the power circuit which is completed when knob 75 is in the range of positions between Warm and High, resistance element 68 of heating unit 66 is connected across lines L1 and N by means of a circuit which includes conductor 91 between line L1 and terminal 78 of switch 74, and an infinite heat switch generally designated by the numeral 92 connected to switch terminal 79 by conductor 93 and to terminal 72 of heating unit 66 by conductor 94. The remaining portion of this power circuit is completed through a conductor 95 connected to terminal 73 of the heating unit and to switch terminal 84, switch contacts 82 and a conductor 96 connecting switch terminal 83 and the neutral line N. Infinite heat switch 92 may be of any suitable well known type; as schematically illustrated in the drawing it includes a periodically reciprocating contact 97 actuated by a rotary cam 98 driven by a constant speed motor 99. This motor is energized through a circuit including conductor 100 between line L1 and switch terminal 89, switch contacts 88, a conductor 101 between switch terminal 90 and the motor, and a conductor 102 between the motor and the neutral line N. Reciprocating contact 97 cooperates with a manually positionable contact 103 moved through its range of movement by means of a cam 104 mechanically connected to knob 75. As those skilled in the art will readily understand, the wattage output of heating unit 66 may be varied from a minimum of the order of 100 watts, for example, when knob 75 is in the Warm position to a maximum of the order of 1,200 watts when knob 75 is in the High position, depending on the on-off ratio of contacts 97 and 103, which of course is determined by the setting of cam 104.

In accordance with the present invention an Ultra-High heat setting is provided in which the contacts of switch 74 are in the positions shown in Fig. 2. Under these circumstances, a second power circuit controlled by relay 105 is completed, and heating unit 66 may be energized at full line voltage across lines L1 and L2 either at periodic intervals or substantially continuously depending upon the temperature of insulating material 69 within the unit. Relay 105 includes a contactor 106 which when closed completes a circuit connecting switch terminal 81 and heating unit terminal 72 through conductors 107 and 108, and a switch contactor 109 which when closed connects switch terminal 87 and heating unit terminal 73 by means of conductors 110 and 111. Thus since switch terminal 86 is connected to line L2 by conductor 112, heating unit terminal 73 is connected directly to line L2 and heating unit terminal 72 is connected directly to line L1 each time contactors 106 and 109 close. Relay 5 is of course, provided with a relay coil 113 which, when energized, causes contactors 106 and 109 to close.

In this embodiment of the invention, the power circuit including relay 105 is controlled by a control circuit generally similar to the control circuit utilized in the embodiment of this invention shown in Fig. 1 and described above. Thus, the control circuit includes a control relay connected in circuit with coil 113 of power relay 105 so as to control energization of the heating unit 66 in accordance with the resistance of the insulating material 69 therein. Relay 114 includes a contactor 115 and a relay coil 116 across which is connected a capacitor 117. The circuit by means of which coil 113 of power relay 105 is energized includes a conductor 102 connecting one terminal of the coil to the neutral line N, a conductor 118 connecting the other terminal of the coil and contactor 115, a conductor 119 connecting the contactor 115 in circuit with a pair of periodically closed contacts 120 actuated by constantly rotating cam 121 which is driven by motor 99, and a conductor 122 connecting these contacts to conductor 110, which, of course, is energized at line L2 voltage when knob 75 is in the Ultra-High position. Contacts 120 are so arranged that their ratio of "on" time to "off" time is of the order of ten to one; for example, these contacts may be alternately closed for ten seconds and open for one second. Thus, coil 113 of power relay 105 is thereby periodically de-energized for a very short time interval, and during this interval the leakage resistance of insulating material 69 is sampled by means of the control circuit now to be described.

During each brief period when resistance element 68 is disconnected from power lines L1 and L2 in this manner, the resistance of insulating material 69 is, in effect, compared with the fixed resistance of resistor 123, which is connected to conductors 110 and 111 so as to shunt contactor 109 of power relay 105. The control circuit utilized to make this comparison may be traced from conductor 110 (energized at line L2 voltage) through resistor 123, conductor 111, heating unit terminal 73, resistance element 68, insulating material 69, and sheath 67 to conductor 124 which is connected to neutral line N. The resistance of resistor 123 is chosen so that it is substantially less than the resistance of insulating material 69 when the latter is below the maximum operating temperature of the heating unit but of the same order of magnitude or even of greater resistance than that of the insulating material when the latter's temperature increases above a predetermined upper limit. Thus the voltage which appears on terminal 73 each time the sampling circuit is energized is utilized as a signal for maintaining relay 114 in closed position if the heating unit temperature is below a predetermined value or to cause the control relay to drop out if this is not the case. The control circuit includes a triode tube 125 having a cathode 126 connected to conductor 124, an anode 127 connected to coil 116 of control relay 114 through a limiting resistor 128, and a grid 129 connected to heating unit terminal 73 through a limiting resistor 130. Thus triode 125 is so arranged that it is rendered conducting so long as the bias on grid 129 is above a cut-off value corresponding to the aforesaid predetermined maximum temperature, and rendered non-conducting when this temperature is exceeded.

From the description thus far, it will be evident that the voltage on control grid 129 of the triode will be less than cut-off only when relay 104 is open and the resistance of insulating material 69 is at a low value corresponding to an over-temperature condition. During normal operation, triode 125 continues to supply current to coil 116 of control relay 114 and hence the circuit including cycling contacts 120 and coil 113 of power relay 105 is continuously energized except for periodic one second interruptions at ten second intervals. During these one second interruptions, the control circuit which includes resistor 123 and insulating material 69 is energized, and since the resistance of insulating material 69 remains high (indicating a normal temperature condition) the voltage on control grid 129 of the triode remains above cut-off, and hence contactor 115 of control relay 114 remains in closed position. At the end of the one second interval the circuit through coil 113 of power relay 105 is again re-established and the power circuit through contactors 106 and 109 of the power relay is reclosed. Thus heating unit 66 is energized substantially continuously at full line voltage, and produces a wattage output of the order of 4200 watts.

If for any reason the temperature of heating unit 66 should exceed its predetermined normal operating temperature, the resistance of insulating material 69 drops to a relatively low value, and this condition will be detected during the next succeeding one second time interval when periodic contacts 120 open the power circuit and energize the control circuit. When this occurs the voltage on grid 129 of the triode instantly decreases to a value below cut-off, coil 116 of the control relay is de-energized, and hence relay 105 drops out, de-energizing the heating unit.

As mentioned above in the description of the embodiment of this invention as shown in Fig. 1, it is desirable that heating unit 66 be periodically energized irrespective of the resistance of insulating material 69 as sensed by the control circuit which has been described inasmuch as moisture in the insulating material decreases its resistance to values in the same range as those encountered in over-temperature conditions. In other words, the control circuit which has been described is incapable of detecting the difference between an overheated unit and a "wet" unit. In the present embodiment, periodic energization may be accomplished by means of a pair of periodically actuated contacts 131 actuated by a constant speed cam 132 driven by motor 99. Contacts 131 are connected in parallel with contactor 115 of control relay 114 so that power relay 105 may be periodically energized regardless of the conducting or non-conducting condition of triode 125. Preferably, contacts 131 are opened and closed at intervals which cause heating unit 66 to be energized during approximately one-fourth of the total energization period so as to provide a minimum wattage level approximately equal to the wattage output of heating unit 66 when control knob 75 is in the High heat position. In order to accomplish this, cam 132 may be synchronized with cam 120 so that contacts 131 close during the last 25% of the intervals when contacts 120 are closed. Thus energization of heating unit 66 will be controlled in accordance with its temperature during the first 75% of the intervals when contacts 120 are closed, but the heating unit will be energized approximately 25% of its total "on" time regardless of the resistance of the insulating material 69.

While I have shown and described two particular embodiments of my invention, I do not desire the invention to be limited to the particular construction disclosed, and I intend by the appended claims to cover all modifications within the true spirit and scope of my invention.

What I claim is:

1. An electric heating system comprising a sheathed heating unit including a metal sheath enclosing a resistance element embedded in a refractory insulating material having a negative temperature coefficient of resistance; a power circuit for connecting said resistance element in circuit with a source of electric power; switching means in said power circuit; a control circuit including said metal sheath, said insulating material and said resistance element arranged to supply a control signal which is a function of the resistance of said insulating material; means for periodically de-energizing said power circuit and energizing said control circuit; and means responsive to said control signal for controlling said switching means so as to limit energization of said heating unit whenever the resistance of said insulating material is less than a predetermined value.

2. An electric heating system comprising a sheathed heating unit including a metal sheath enclosing a resistance element embedded in a refractory insulating material having a negative temperature coefficient of resistance; a power circuit for connecting said resistance element in circuit with a source of electric power; switching means in said power circuit; a control circuit including said metal sheath, said insulating material and said resistance element arranged to supply a control signal which is a function of the resistance of said insulating material; means for periodically de-energizing said power circuit and energizing said control circuit; means responsive to said control signal for controlling said switching means so as to limit energization of said heating unit whenever the resistance of said insulating material is less than a predetermined value, and means for periodically actuating said switching means to closed circuit position so as to provide a minimum heat output level from said heating unit regardless of the resistance of said insulating material.

3. An electric heating system as defined in claim 1 in which said signal responsive means includes a gaseous discharge tube provided with an anode and a cathode and a control grid, said control grid being connected in said control circuit so that its voltage varies in accordance with changes in the resistance of said insulating material, said control circuit being arranged to apply a voltage less than cut-off to said control grid when the resistance of said insulating material is less than a predetermined value and greater than cut-off when its resistance is greater than the predetermined value, and a control relay in circuit with said anode and arranged to control said switching means.

4. An electric heating system comprising a sheathed heating unit including a metal sheath enclosing a resistance element embedded in a refractory insulating material having a negative temperature coefficient of resistance; first and second power circuits for connecting said resistance element in circuit with a source of electric power; a selector switch for energizing one or the other of said power circuits from said power source; a manually adjustable infinite heat switch in said first power circuit; switching means in said second power circuit; a control circuit including said metal sheath, said insulating material and said resistance element arranged to supply a control signal which is a function of the resistance of said insulating material; means for periodically de-energizing said power circuit and energizing said control circuit; and means responsive to said control signal for controlling said switching means so as to limit energization of said heating unit through said second power circuit whenever the resistance of said insulating material is less than a predetermined value.

5. An electric heating system comprising a sheathed heating unit including a metal sheath enclosing a resistance element embedded in a refractory insulating material having a negative temperature coefficient of resistance; first and second power circuits for connecting said resistance element in circuit with a source of electric power; a selector switch for energizing one or the other of said power circuits from said power source; a manually adjustable infinite heat switch in said first power circuit; switching means in said second power circuit; a control circuit including said metal sheath, said insulating material and said resistance element arranged to supply a control signal which is a function of the resistance of said insulating material; means for periodically de-energizing said power circuit and energizing said control circuit; and means responsive to said control signal for controlling said switching means so as to limit energization of said heating unit through said second power circuit whenever the resistance of said insulating material is less than a predetermined value; and means for periodically actuating said switching means to closed circuit position so as to provide a minimum heat output level from said heating unit regardless of the resistance of said insulating material.

6. An electric heating system as defined in claim 4 in which said signal responsive means includes a gaseous discharge tube provided with an anode and a cathode and a control grid, said control grid being connected in said control circuit so that its voltage varies in accordance with changes in the resistance of said insulating material, said control circuit being arranged to apply a voltage less than cut-off to said control grid when the resistance of said insulating material is less than a predetermined value and greater than cut-off when its resistance is greater than the predetermined value, and a control relay in circuit with said anode and arranged to control said switching means.

7. An electric heating system comprising a pair of sheathed heating units each including a metal sheath enclosing a resistance element embedded in a refractory insulating material having a negative temperature coefficient of resistance; a plurality of power circuits for connecting said resistance elements in circuit with a three wire source of electric power singly and in various series and parallel circuit relationships; a multi-position multi-contact switch connected to said resistance elements and said power source so as to provide manual selection of any one of said power circuits, one of said circuits including means arranged to connect said resistance elements in parallel at full line voltage, switching means in said one of said power circuits; a control circuit including said metal sheaths, the insulating material therein and said resistance elements arranged to supply a control signal which is a function of the resistance of said insulating material; means for periodically deenergizing said one of said power circuits and energizing said control circuit; and means responsive to said control signal for controlling said switching means so as to limit energization of said heating units whenever the resistance of said insulating material is less than a predetermined value.

8. An electric heating system comprising a pair of sheathed heating units each including a metal sheath enclosing a resistance element embedded in a refractory insulating material having a negative temperature coefficient of resistance; a plurality of power circuits for connecting said resistance elements in circuit with a three wire source of electric power singly and in various series and parallel circuit relationship; a multi-position multi-contact switch connected to said resistance elements and said power source so as to provide manual selection of any one of said power circuits, one of said circuits including means arranged to connect said resistance elements in parallel at full line voltage; switching means in said one of said power circuits; a control circuit including said metal sheaths, the insulating material therein and said resistance elements arranged to supply a control signal which is a function of the resistance of said insulating material; means for periodically de-energizing said one of said power circuits and energizing said control circuit; means responsive to said control signal for controlling said switching means so as to limit energization of said heating units whenever the resistance of said insulating material is less than a predetermined value, and means for periodically actuating said switching means to closed circuit position so as to provide a minimum heat output level regardless of the resistance of said insulating material.

9. An electric heating system as defined in claim 8 in which said signal responsive means includes a gaseous discharge tube provided with an anode and a cathode and a control grid, said control grid being connected in said control circuit so that its voltage varies in accordance with changes in the resistance of said insulating material, said control circuit being arranged to apply a voltage less than cut-off to said control grid when the resistance of said insulating material is less than a predetermined value and greater than cut-off when its resistance is greater than the predetermined value, and a control relay in circuit with said anode and arranged to control said switching means.

References Cited in the file of this patent

UNITED STATES PATENTS

| | | |
|---|---|---|
| 2,467,856 | Rich | Apr. 19, 1949 |
| 2,686,250 | Schroeder | Aug. 10, 1954 |
| 2,863,035 | Vinson et al. | Dec. 2, 1958 |

FOREIGN PATENTS

| | | |
|---|---|---|
| 577,128 | Great Britain | May 6, 1946 |
| 789,295 | Great Britain | Jan. 15, 1958 |